United States Patent [19]

Kowalski et al.

[11] 4,059,343
[45] Nov. 22, 1977

[54] PRISMATIC ANAMORPHIC SYSTEM FOR OPTICAL CORRELATORS

[75] Inventors: Daniel C. Kowalski, Menlo Park, Calif.; Juan C. Dawson, Littleton, Colo.; Stanley J. Krulikoski, deceased, late of Dearborn, Mich., by Shirley Ann Krulikoski, executrix

[73] Assignee: The United States of America as represented by the Secretary of the Air Force, Washington, D.C.

[21] Appl. No.: 661,462

[22] Filed: Feb. 26, 1976

[51] Int. Cl.² .................... G02B 13/10; G02B 5/18
[52] U.S. Cl. .................... 350/182; 350/185; 350/162 SF
[58] Field of Search .................... 350/185, 182

[56] References Cited
U.S. PATENT DOCUMENTS

| 2,816,481 | 12/1957 | Farley | 350/185 |
| 2,828,670 | 4/1958 | Luboshez | 350/185 |
| 2,855,819 | 10/1958 | Luboshez | 350/185 X |
| 3,497,289 | 2/1970 | Oberheuser | 350/185 X |

*Primary Examiner*—John K. Corbin
*Assistant Examiner*—John D. Lee
*Attorney, Agent, or Firm*—Joseph E. Rusz; Jacob N. Erlich

[57] ABSTRACT

A prismatic anamorphic system for use with an optical correlator. The prismatic anamorphic system incorporates four rotatable prisms arranged within the optical correlator thereby permitting correlator operation about unity magnification with no image rotation and no axial translation as the magnification is varied. In this manner proper correlation of a pair of photographs can be performed in an economical and highly reliable fashion.

11 Claims, 7 Drawing Figures

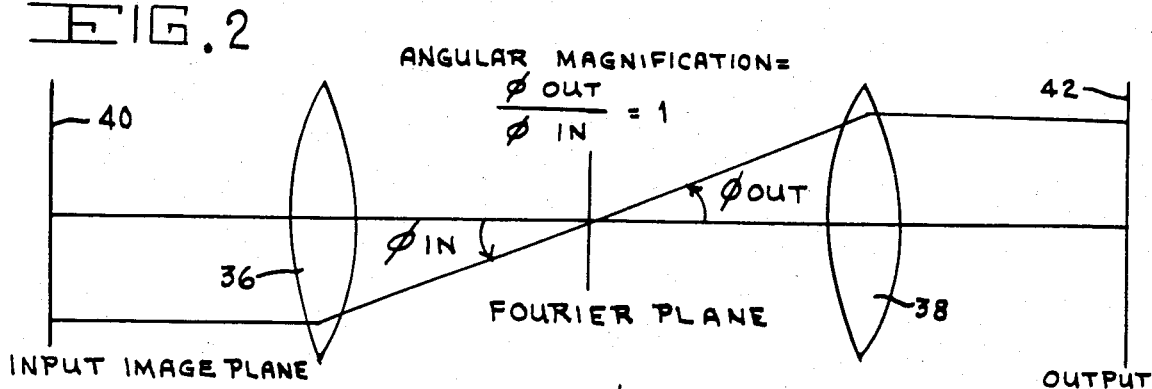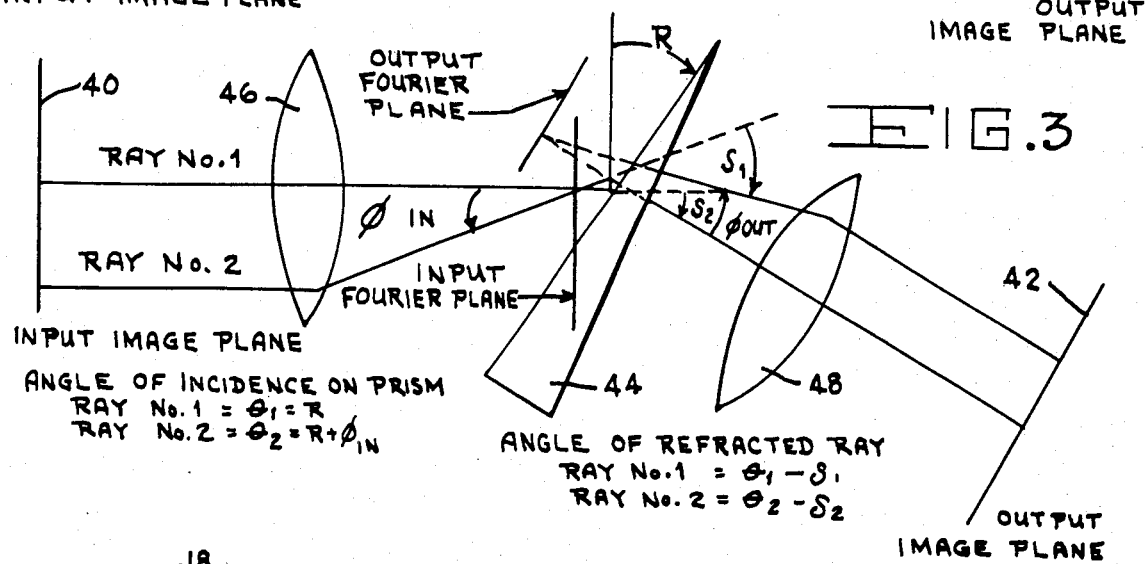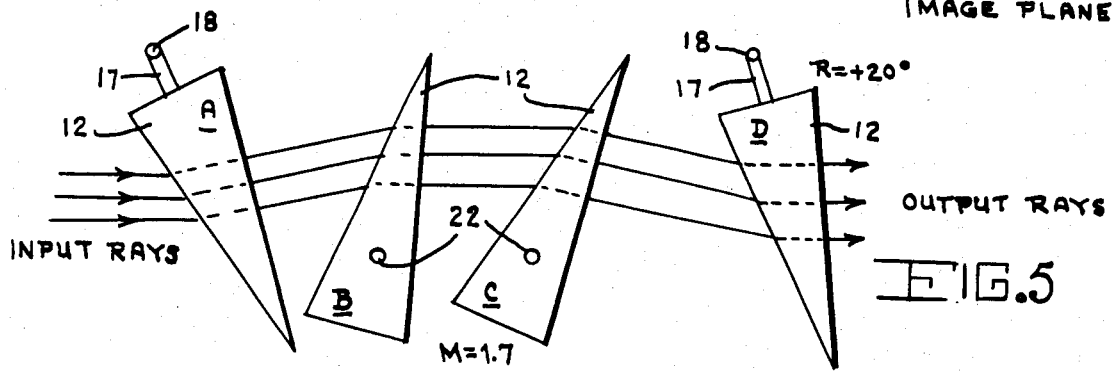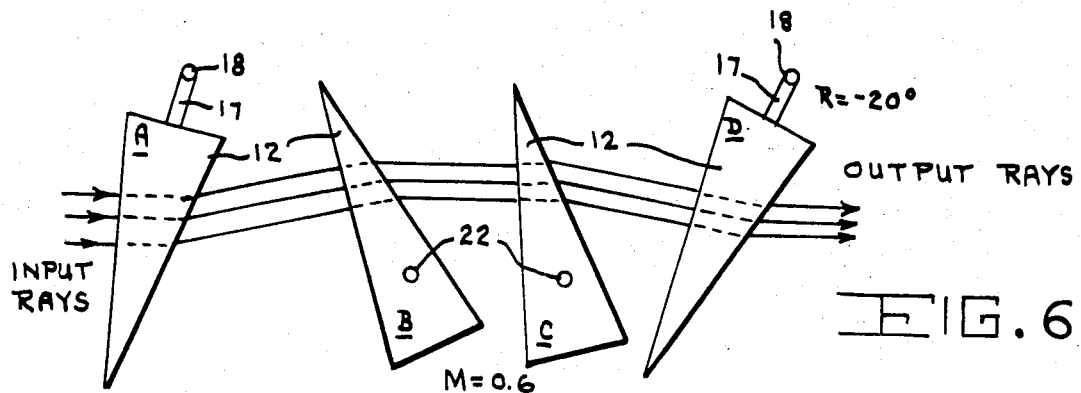

PRISMATIC ANAMORPHIC SYSTEM FOR OPTICAL CORRELATORS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to optical correlators, and, more particularly to a prismatic anamorphic system for use therewith.

Most topographic maps are made from aerial sterophotographs with the aid of photogrammetric measuring instruments capable of stereoperception. In recent years, the increasing demand for topographic maps has prompted the development of automatic stereoperception equipment which functions by accurately matching corresponding images in stereophotographs. All such equipment incorporates correlation-measurement techniques, which are ideally suited to the task.

The most successful automation to date has been achieved using flying-spot scanners in conjunction with electronic correlators. However, the general availability of reliable laser light sources for coherent optical processing now makes it practical to use optical correlation techniques, with a view to increasing speed and accuracy.

Two obvious advantages associated with optical correlation techniques are (1) an almost instantaneous processing speed and (2) a potentially high signal-to-noise performance, the latter being made possible by the greater intensity of the laser light as compared with the cathode-ray-tube (CRT) spot in the flying-spot scanner. For these advantages to be realized, however, an optical correlator is required that is capable of extracting certain measurements from stereoimages and is at the same time compatible with optical systems that compensate for relative image distortion.

In general, there are two types of optical photographic-image correlators, the two-image or image/image correlator and the image/matched-filter correlator. Both operate on well-documented principles. In the two-image correlator, as the name implies, two images are correlated directly. In the image/matched-filter correlator, correlation is between an image and a matched filter — a holographic recording of the Fourier transform of the second image. Of the two, only the two-image correlator is compatible with present stereophotogrammetric instruments, which use two-photograph images as inputs.

To accurately match images in stereophotographs, the correlation technique used must be capable of extracting three types of measurement: alignment error, distortion error, and correlation quality. It must also incorporate means of compensating for first-order distortion and terrain roughness. Alignment-error signals are required for the automatic positioning of corresponding stereoimages in the correlator aperture and so are fundamental to the entire automatic image-matching process. Distortion-error and correlation-quality signals are less important, but they do contribute significantly to the accuracy and effectiveness with which image matching is accomplished.

The nature of the sterophotographic process is such that it produces relative image distortion. Corresponding stereoimages are exactly alike only if the terrain is flat and if perfectly vertical frame photographs are used. Relative camera tilt and terrain-elevation changes result in significant differences in appearance between the two images. When such distorted images are superimposed in the correlator, image registration is poor and correlation measurements and correlation-derived alignment-error signals are inaccurate. A high degree of matching accuracy can be maintained only if the images can be made to appear nearly identical to the correlator. An accurate automatic image-matching system must therefore incorporate techniques both for measuring relative image distortion and for compensating or correcting for it.

The basic configuration of the two-image optical correlator system incorporates a laser light source, a phototube detector, three transform lenses, and two spatial filters. The laser provides an intense beam of collimated coherent light that acts as the signal carrier throughout the optical system. It is directed down the optical axis toward the phototube and successively passes through each element of the optical train.

As the beam emerges from the first diapositive, it picks up all the pictorial information stored in the image. As it proceeds toward the transform lens, it fans out (a diffraction effect produced by the detail in the diapositive) carrying all the pertinent image information. At most, only half of the transmitted light can be diffracted. The transform lens distributes the diffracted light in a manner analogous to the Fourier frequency decomposition of signals. For the correlator to work effectively, the average background of the first image must be removed. This is accomplished by placing an opaque circular light block on the optical axis of the frequency plane, where this frequency component of the image lies. The process is called spatial filtering, and the specific filter used here is commonly referred to as a DC block because it removes the direct component from the image.

The amplitude distribution of the light emerging from the second stereo diapositive is the product of the detail in the first image and the unfiltered image in the second diapositive. The output lens takes a second successive Fourier transform of this product signal and displays it in its front focal plane. The correlation signal appears directly on the optical axis in the second frequency plane, this term being separated from the other light by a pinhole field stop. A phototube directly in line with the pinhole measures the intensity of the transmitted light. What is actually measured is the square of the absolute value of the correlation function, since the latter is expressed in terms of light amplitude rather than intensity; for purposes of this application, however, there is no significant difference between the characteristics of the correlation function and those of its squared value.

A major problem with the optical correlator is accommodating differential scale resulting from camera geometry and/or terrain slope. An especially common problem is one where sloping terrain, as a result of camera perspective displays a scale change in one direction and not the other. Heretofore corrective techniques were extremely cumbersome insofar as they involved the axial translation of three components or utilized zoom lenses, either spherical or cylindrical, which required an additional scale change since operation around unity magnification is precluded. Furthermore, as the focal length of the zoom is changed, the zoom lens must be translated axially. There clearly exists a need for a corrective system which permits operation about unity magnification, introduces no image rotation, and, with proper design requires no axial translation as the magnification is varied.

SUMMARY OF THE INVENTION

The instant invention sets forth a prismatic anamorphic system for utilization within an optical correlator which overcomes the problems encountered in the past and as set forth in detail hereinabove. This invention uses a set of four prisms and is designed to operate about unity magnification and to introduce no lateral or axial shift of the subsequent image and frequency planes that would affect operation of a coherent optical system. The only dynamic motion being the individual prism rotation.

The prismatic anamorphic system is made up of four prisms arranged in tandem configuration, each fastened to a mounting plate that is pinned to rotate about a specific point on a base plate. All of the prisms straddle a channel positioned down the center of the base plate in which the prism drive cam moves. Each of the prism mounting plates being connected to a slot in the drive cam by means of a dowel pin. As the drive cam moves in the channel it causes the prisms to rotate about their pivot points in the base plate. The slots for the first and third prisms are perpendicular to the cam drive. The slots that are used to drive prisms two and four are tilted; and are used to compensate for the nonsymmetry of the prism deviation curves when they are used in such a complementary configuration.

The cam drive pins fastened to the prism mounting plate are mounted such that each prism is at the minimum angle of deviation for unity magnification of the image. A counterclockwise rotation as defined by the first prism produces a magnification, and a clockwise rotation produces a minification. Any conventional dc motor electrically controls the position of the cam for automatic magnification control.

The prismatic anamorphic system of this invention is centered between two lenses of an optical correlator, with the exact spacing and apex location and rotational axes being determined by the focal length of the lenses. The input function or photograph is located just ahead of the first lens. This lens computes the Fourier transform of the input and the prisms of the system of this invention are symmetrically arranged about the transform plane which is a focal length behind the lens. The two lenses image the input at a field stop. By this arrangement, the input may be scaled by the prisms without distorting the defining aperture which is the field stop. A spatial filter is located thereafter for the correlation process.

The above mentioned lenses in conjunction with the other lenses and the prism system, image the input or photograph onto a second photograph. The measure of the correlation of the two photographs is detected at a pinhole aperture.

It is therefore an object of this invention to provide a prismatic anamorphic system for utilization within an optical correlator.

It is another object of this invention to provide a prismatic anamorphic system in which the magnification produced thereby is purely anamorphic.

It is still another object of this invention to provide a prismatic anamorphic system which permits operation about unity magnification.

It is a further object of this invention to provide a prismatic anamorphic system which does not introduce either image rotation or axial and radial translation as the magnification is varied.

It is still a further object of this invention to provide a prismatic anamorphic system which is economical to produce, simple in operation and which utilizes conventional currently available components that lend themselves to standard mass producing manufacturing techniques.

For a better understanding of the present invention together with other and further objects thereof reference is now made to the following description taken in conjunction with the accompanying drawing and its scope will be pointed out in the appended claims.

DESCRIPTION OF THE DRAWING

FIG. 2 is a schematic representation of a pair of lenses arranged as a one-to-one telescope between two image planes;

FIG. 3 is a schematic representation of a single prism placed between two lenses and rotated at some arbitrary angle;

FIG. 5 is a schematic representation of an optical path through the prismatic anamorphic system of this invention illustrating magnification;

FIG. 6 is a schematic representation of an optical path through the prismatic anamorphic system of this invention illustrating minification.

DETAILED DESCRIPTION OF THE PREFERRED EMBODIMENT

To perform accurate measurements of corresponding points in aerial stereo photographs by coherent optical correlation techniques, distortion compensation of one image is required. Compensation of image distortion is a far more difficult problem in a coherent optical correlator than in an instrument designed exclusively for visual use such as a stereo viewer. In the correlator, computations are performed with both the images and the Fourier transforms of the images. In particular, this means that a distortion compensation system operating in a correlator must satisfy the following requirements:

1. It must preserve the optical quality of the image phase front;
2. It must not introduce any image displacements of comparable magnitude to the metrological accuracy;
3. It must preserve the Fourier transform beam free of undesirable aberrations; and
4. It must not introduce displacements in the Fourier transform beam.

If these requirements are not met, distortion compensation could degrade the correlation signal output more than improve it, or it could introduce errors in the measurements.

Figure 1:
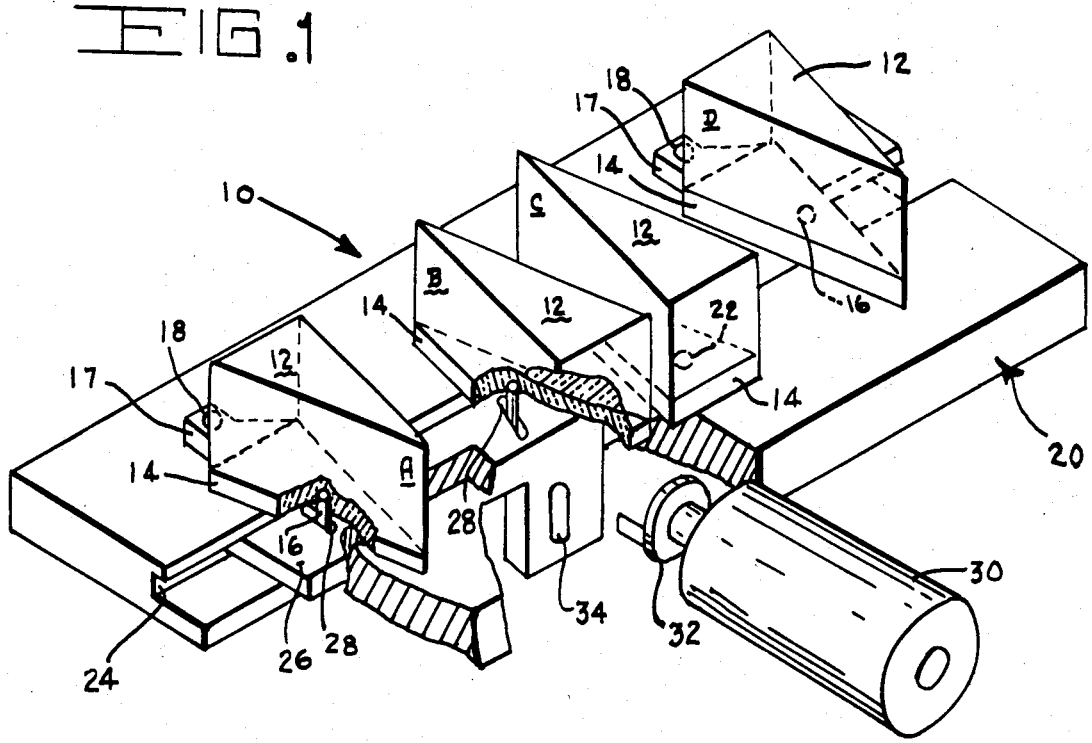
FIG. 1 is a pictorial representation of the prismatic anamorphic system of this invention.

Reference is now made to FIG. 1 of the drawing which pictorially represents the prismatic anamorphic system 10 of this invention which fulfills the criteria set forth hereinabove. Prismatic anamorphic system 10 is made up of four prisms 12 arranged in tandem configuration. Each prism 12 (also preferred to as prisms A, B, C and D) is secured by a conventional securing method to a separate mounting plate 14, with the configuration of each mounting plate 14 conforming to the configuration of the prism 12 associated therewith. Located in the bottom central portion of each mounting plate 14 is an outstanding element 16, the relationship of elements 16 to the other elements of this invention will be set forth hereinbelow. In addition to elements 16 an extension 17 is formed at the base of the mounting plates 14 supporting prisms A and D. A pivotal connection such as a dowel pin 18 secures prisms A and D in a pivotal connection to a base plate 20 while the remaining prisms B and C are pivotally connected by dowel pins 22 on respective mounting plates 14 directly to base plate 20.

All the prisms 12 straddle a longitudinal channel 24 positioned down the center of base plate 20. A drive cam 26 in the form of an elongated plate is slidably contained within channel 24. Located within plate or drive cam 26 are a plurality of slots 28 (only two of which are shown in FIG. 1) corresponding in number to the number of prisms 12. Each outstanding element 16 is in operative and engaging relationship with an adjacent slot 28 of drive cam 26. As drive cam 26 moves within channel 24 it causes the prisms 12 to rotate about their respective pivot pins 18 and 22 within base plate 20. The slots 28 associated with prisms A and C are perpendicular to the longitudinal axis of drive cam or elongated plate 26 while slots 28 associated with prisms B and D are tilted or at an angle but not perpendicular with respect to the longitudinal axis of drive cam 26. In this manner they are capable of compensating for the non-symmetry of the prism deviation curves (see FIG. 4) when they are used in such a complementary configuration.

The cam drive pins 16 secured to mounting plates 14 are mounted such that each prism 12 is at a minimum angle of deviation for unity magnification of the image. A counterclockwise rotation as defined by the first prism 12 produces a magnification (see FIG. 5). A clockwise rotation as defined by the first prism 12 produces a minification (see FIG. 6). Any suitable power source such as a conventional DC motor connection by a rotary driver 32 and drive slot 34 within cam plate 26 controls the position of the cam plate 26 for automatic magnification control of this invention.

As an aid in understanding the prism distortion correction of the prismatic anamorphic system 10 of this invention, it is helpful to understand the anamorphic magnification produced by a single prism. FIG. 2 of the drawing shows a pair of lenses 36 and 38 arranged as a one-to-one telescope between two image planes 40 and 42, respectively. In FIG. 3, a single prism 44 is placed between two lenses 46 and 48 and rotated at some arbitrary angle R. The magnification between any two points in the image plane is determined by taking the ratio between the input angle $\phi_{in}$ and output angles $\phi_{out}$ of two rays from these points as shown in the drawing ($m = \phi_{out}/\phi_{in}$). Note that it was necessary to move lens 38 of FIG. 2 to the position of lens 48 in order to compensate for the shift in the output Fourier plane.

Figure 4:
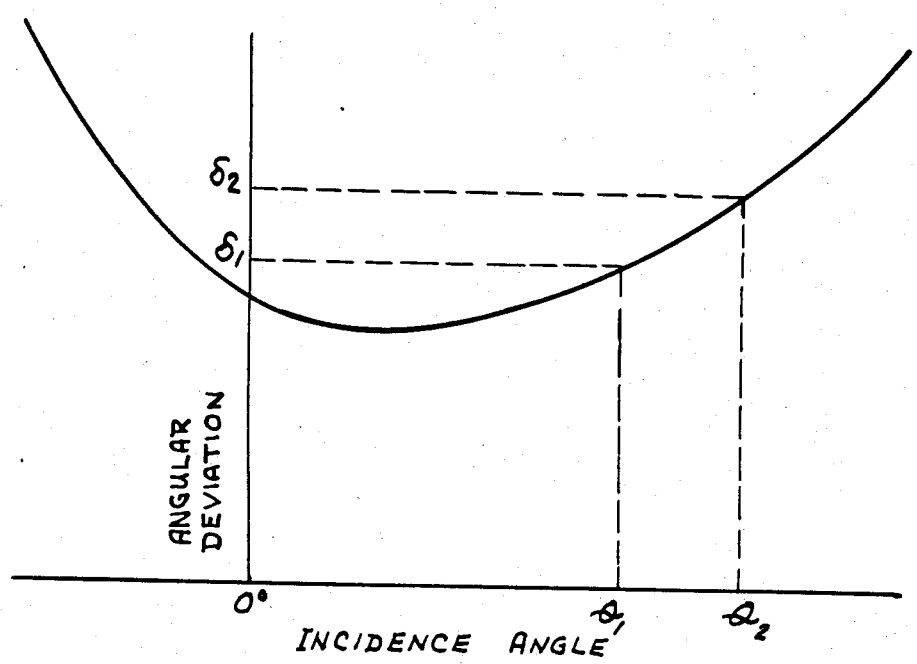
FIG. 4 is a graphic representation of a prism deviation curve.

Reference is now made to FIG. 4 of the drawing. For convenience, let the normal to the first prism face be the reference for angular measurement. Then $$m = \frac{\phi_{out}}{\phi_{in}} = \frac{\theta_2 - \theta_1 - (\delta_2 - \delta_1)}{\theta_2 - \theta_1}$$

-continued
$$m = 1 - \frac{\delta_2 - \delta_1}{\theta_2 - \theta_1}$$

Thus, the angular magnification is given by one minus the slope of the tangent line on the prism deviation curve shown in FIG. 4.

From the above, several important observations can be made.

1. In order to have distortion-free magnification (i.e., constant across the aperture), the range of input angles must be small so that the deviation curve may be approximated by its tangent. This means that the aperture in the input image plane must be small.

2. At minimum deviation, the slope of the tangent is zero; therefore, when the rays from the center of the aperture are incident on the prism at the angle of minimum deviation, the magnification will be unity. If the image plane aperture is too large, however, distortion will begin to appear at the edges of the field.

3. The magnification is variable because the slope of the deviation curve varies as a function of incidence angle on the prism.

Unfortunately, the use of one prism 44 as shown in FIG. 3 of the drawing to provide anamorphic distortion in an optical correlator is not very feasible. As can be seen by referring again to FIG. 3, both the image and Fourier transform planes of the optical system are displaced when the prism is rotated. In an optical correlator, it is desirable to keep both the output image and transform planes stationary in order to obtain faster correlator operation, and to avoid introducing mechanical errors.

To keep the image plane stationary, any input ray parallel to the optical axis must leave the output Fourier plane parallel to the axis. This is accomplished by placing a second prism just after the first and inverting it to cause the deviations on the axial ray to cancel. The anamorphic magnification in the two prisms adds; and, the result is a stationary image plane when the prisms are differentially rotated to vary the magnification.

However, the transform plane is laterally displaced from the optical axis, and the magnitude of this displacement varies with the amount of anamorphic magnification introduced. In order to correct for this, it is necessary to use two more prisms and adjust their rotations to cancel the displacement of the first pair. Again, the anamorphic magnifications add, so that the first order solution is anamorphic magnifications with stationary image and transform planes. FIGS. 5 and 6 of the drawing contain a diagram of the developed prismatic system of this invention. It shows the optical path of a parallel bundle of rays through the prisms 12 for two different orientations. The first shown in FIG. 5 produces a magnification and the second shown in FIG. 6 a minification. Both configurations of the instant invention satisfy the requirements for proper correlation operations.

Figure 7:
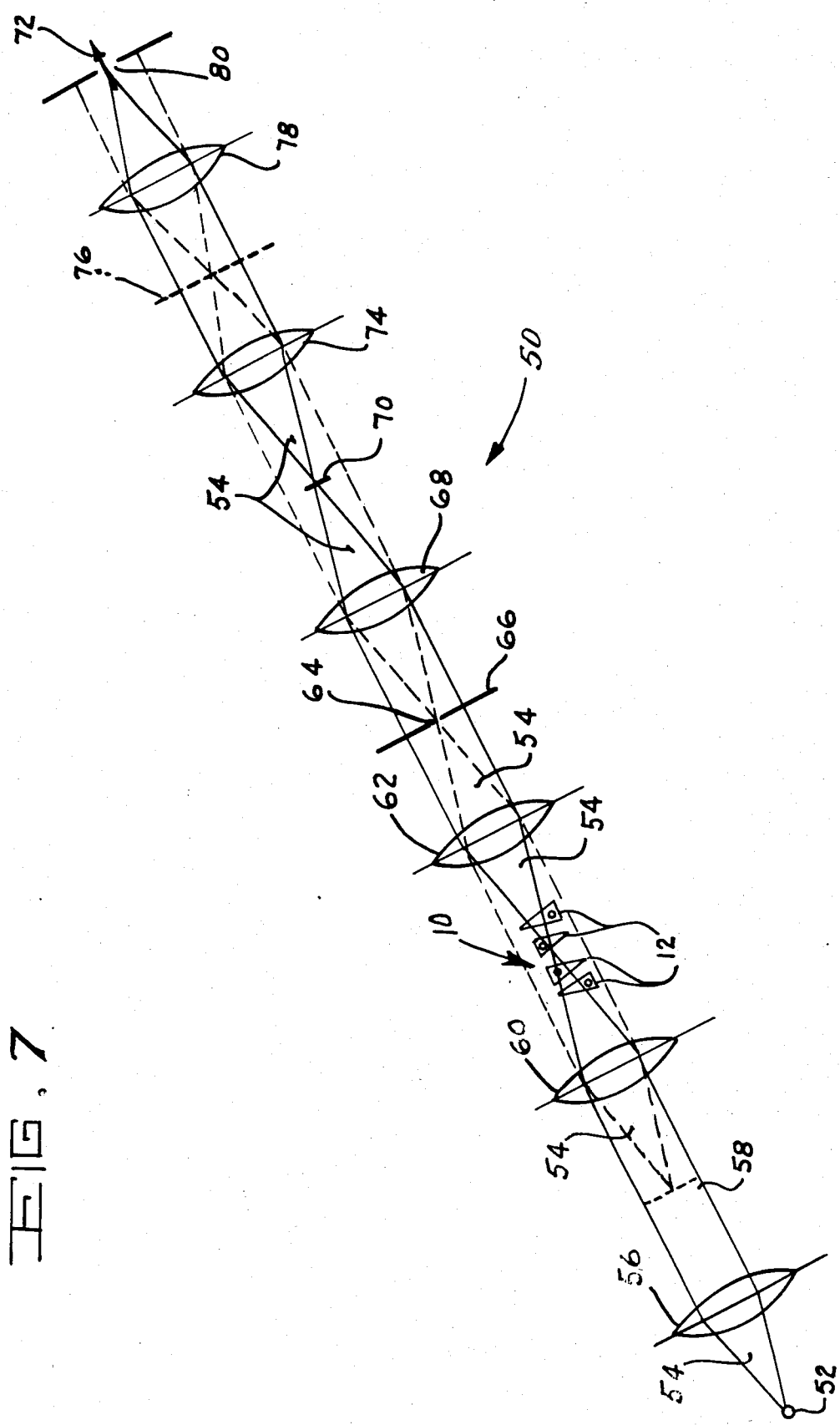
FIG. 7 is a schematic representation of an optical correlator having the prismatic anamorphic system of this invention contained therein.

Reference is now made to FIG. 7 of the drawing which shows the prismatic anamorphic system 10 of this invention in position within an optical correlator 50. Within the arrangement shown in FIG. 7 any suitable light source 52 provides a beam of light 54 which is expanded to a collimated beam of light approximately 3cm. in diameter by lens 56 so as to flatten its intensity. The transmitted light 54 is directed through a first transparency or photograph 58. The transmitted light which is modulated and diffracted by photo image 58 is collected by lens 60 which transforms it into its Fourier spectrum. The prismatic anamorphic system 10 of this invention is placed between lenses 60 and 62 where the Fourier transform plane exists. Prismatic anamorphic system 10 is symmetrically arranged about the transform plane which is a focal length behind lens 60. The two lenses 60 and 62 image the light 54 at 64 which includes a field stop or aperture 66. By this arrangement the image light beam 54 may be scaled by the prisms 12 of system 10 without distorting the defining aperture 66. The aperture or field stop 66 is placed in this plane because it provides a means for accurately controlling the image area without physically contacting or obstructing any area in the vicinity of the photo 58. After leaving aperture 66 the light 54 proceeds through lens 68 which forms the Fourier transform of the image in a plane containing a spatial filter such as dc block 70. The dc block 70 is placed on the optical axis in this plane to remove background intensity of the first image. This blocking of the light 54 is required in order to obtain a true correlation measurement at the correlator output 72. The light 54 that passes around dc block 70 is retransformed to an image by lens 74. The imagery in the second photograph 76 modulates and diffracts the light from the superimposed first image. Lens 78 integrates the product image, this integral being a measure of the correlation of the two photographs 58 and 76. This correlation is detected at the pinhole aperture 80 into output 72. With the utilization of the prismatic anamorphic system 10 of this invention set forth in detail hereinabove within optical correlator 50, a virtually distortion-free output is produced. In addition the instant invention permits operation about unity magnification, introduces no image rotation and requires no axial or radial translation as the magnification is varied.

Although this invention has been described with reference to a particular embodiment it will be understood to those skilled in the art that this invention is also capable of a variety of alternate embodiments within the spirit and scope of the appended claims.

We claim:

1. A prismatic anamorphic system comprising a base plate having a surface thereon, said base plate having a longitudinal channel therein, a plurality of prisms, said plurality of prisms being arranged along the longitudinal axis of said base plate with adjacent pairs of prisms having their respective bases located on opposite sides of said longitudinal channel, each of said prisms being pivotally connected to said base plate about an axis, the pivotal axis of each of said prisms being perpendicular to said surface of said base plate, means located within said channel for rotating said prisms about said pivotal connections and means operatively connected to said means for rotating said prisms for providing operative power thereto.

2. A prismatic anamorphic system as defined in claim 1 wherein said adjacent pairs of prisms have their respective pivotal connections on opposite sides of said longitudinal channel.

3. A prismatic anamorphic system as defined in claim 2 wherein there are four prisms pivotally mounted on said base plate.

4. A prismatic anamorphic system as defined in claim 3 wherein said prisms are mounted sequentially along the longitudinal axis of said base plate and the first and fourth prism having their respective pivotal connections on one side of said longitudinal channel and the second and third prism having their respective pivotal connections on the other side of said longitudinal channel.

5. A prismatic anamorphic system as defined in claim 4 wherein each of said prisms is secured to a mounting plate.

6. A prismatic anamorphic system as defined in claim 5 wherein said means for rotating said prism is in the form of an outstanding element located on each of said mounting plates and a drive cam operatively associated with said outstanding elements.

7. A prismatic anamorphic system as defined in claim 6 wherein said drive cam has a plurality of slots therein, said slots corresponding in number to said prisms and being in operative engagement with said outstanding elements.

8. A prismatic anamorphic system as defined in claim 7 wherein said slots are arranged in sequential order with said first and fourth slots being perpendicular to the longitudinal axis of said base plate and said second and third slots being at an angle to but not perpendicular to said longitudinal axis.

9. A prismatic anamorphic system as defined in claim 8 wherein said mounting plates of said first and fourth prisms have an extension thereon, each of said extensions being pivotally connected to said base plate.

10. A prismatic anamorphic system as defined in claim 9 wherein said mounting plates of said second and third prisms are pivotally connected directly to said base plate.

11. A prismatic anamorphic system as defined in claim 10 wherein said power supplying means is in the form of an electric motor.

* * * * *